(12) United States Patent
Bolinth et al.

(10) Patent No.: US 7,366,088 B2
(45) Date of Patent: Apr. 29, 2008

(54) METHOD AND ORTHOGONAL FREQUENCY DIVISION MULTIPLEXING (OFDM) RECEIVER FOR REDUCING THE INFLUENCE OF HARMONIC INTERFERENCE ON OFDM TRANSMISSION SYSTEMS

(75) Inventors: Edgar Bolinth, Mönchengladbach (DE); Dirk Galda, Hamburg (DE); Ralf Kern, Bocholt (DE); Hermann Rohling, Wolfenbüttel (DE)

(73) Assignee: Siemens Aktiengesellschaft, Munich (DE)

( * ) Notice: Subject to any disclaimer, the term of this patent is extended or adjusted under 35 U.S.C. 154(b) by 938 days.

(21) Appl. No.: 10/380,339

(22) PCT Filed: Sep. 12, 2001

(86) PCT No.: PCT/DE01/03507

§ 371 (c)(1),
(2), (4) Date: Mar. 12, 2003

(87) PCT Pub. No.: WO02/23844

PCT Pub. Date: Mar. 21, 2002

(65) Prior Publication Data

US 2004/0022175 A1 Feb. 5, 2004

(30) Foreign Application Priority Data

Sep. 12, 2000 (DE) ................................ 100 45 088

(51) Int. Cl.
*H04J 11/00* (2006.01)

(52) U.S. Cl. .................... 370/203; 370/208; 375/260; 375/346

(58) Field of Classification Search ..................... None
See application file for complete search history.

(56) References Cited

U.S. PATENT DOCUMENTS 5,357,502 A 10/1994 Castelain et al.

(Continued)

FOREIGN PATENT DOCUMENTS

DE 195 20 353 12/1996

(Continued)

OTHER PUBLICATIONS

Muschallik, "Improving an OFDM Reception Using an Adaptive Nyquest Windowing", IEEE 1996, pp. 259-269.*

(Continued)

*Primary Examiner*—Edan Orgad
*Assistant Examiner*—Jung Park
(74) *Attorney, Agent, or Firm*—Bell, Boyd & Lloyd LLP

(57) ABSTRACT

A method and OFDM receiver are provided for reducing the influence of harmonic interference on OFDM transmission systems, wherein high interference unity is achieved by the simultaneous use of a window function and a determined item of reliability information, the window function being a Nyquist-shaped window function which generates low side lobes in the subcarrier and interference spectra while simultaneously leaving the orthogonality of the subcarriers unchanged, the determined item of reliability information being derived from a measurement when transmitting a so-called zero symbol, in order to detect the instantaneously active interference signals, with the high interference immunity being achieved when the subcarrier-specific information is taken into account in a so-called Viterbi decoder.

5 Claims, 10 Drawing Sheets

U.S. PATENT DOCUMENTS

| | | | | |
|---|---|---|---|---|
| 6,088,327 | A | * | 7/2000 | Muschallik et al. ......... 370/210 |
| 6,507,619 | B1 | * | 1/2003 | Thomson et al. ........... 375/241 |
| 6,959,050 | B2 | * | 10/2005 | Baum et al. ................ 375/326 |
| 2002/0051498 | A1 | * | 5/2002 | Thomas et al. ............. 375/262 |

FOREIGN PATENT DOCUMENTS

| | | |
|---|---|---|
| DE | 197 38 780 | 3/1999 |
| DE | 198 38 295 | 6/1999 |
| DE | 197 35 216 | 7/1999 |
| DE | 198 27 514 | 12/1999 |
| EP | 0 802 649 | 10/1997 |
| FR | 2 776 151 | 9/1999 |
| GB | 2 320 868 | 7/1998 |

OTHER PUBLICATIONS

Jean Armstrong, "Analysis of New and Existing Methods of Reducing Intercarrier Interference Due to Carrier Frequency Offset in OFDM", IEEE 1999, pp. 365-369.*

Muller-Weinfurtner et al., "Optimum Nyquist Windowing for improved OFDM Receivers", IEEE 2000, pp. 711-715.*

Muller-Weinfurtner et al., "Optimum Nyquist Windowing in OFDM Receivers", IEEE 2001, pp. 417-420.*

Muller-Weinfurtner et al, "Robust OFDM Reception with Near-Optimum Nyquist Window", IEEE 1999, pp. 289-293.*

1996, IEEE 46th Vehicular Technology Conference "Mobile Technology for the Human Race".

IEEE Transactions on Communications 39(May 1991), No. 5, "An Adaptive Coding Scheme for Time-Varying Channels" Vucetic.

* cited by examiner

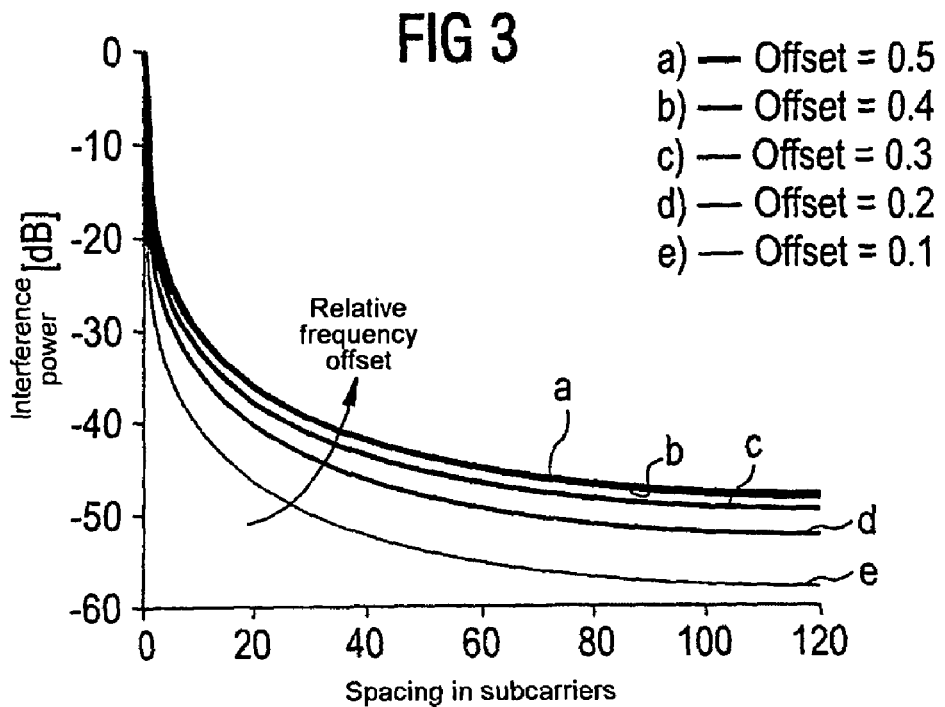
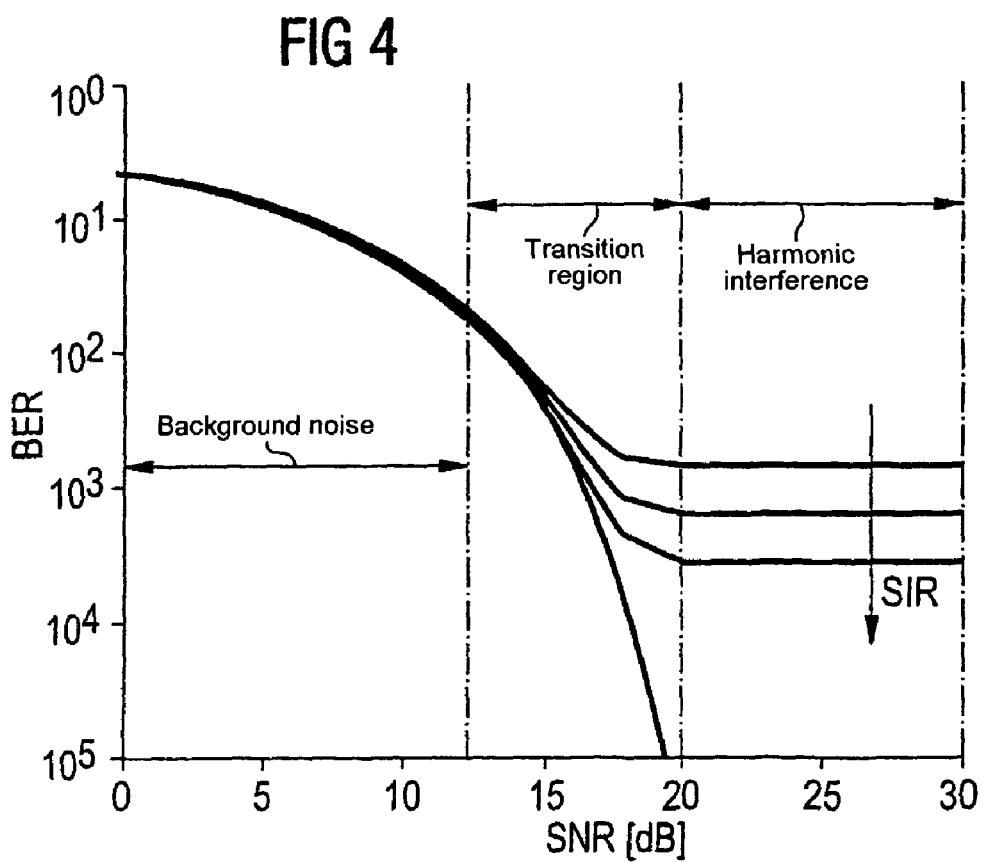

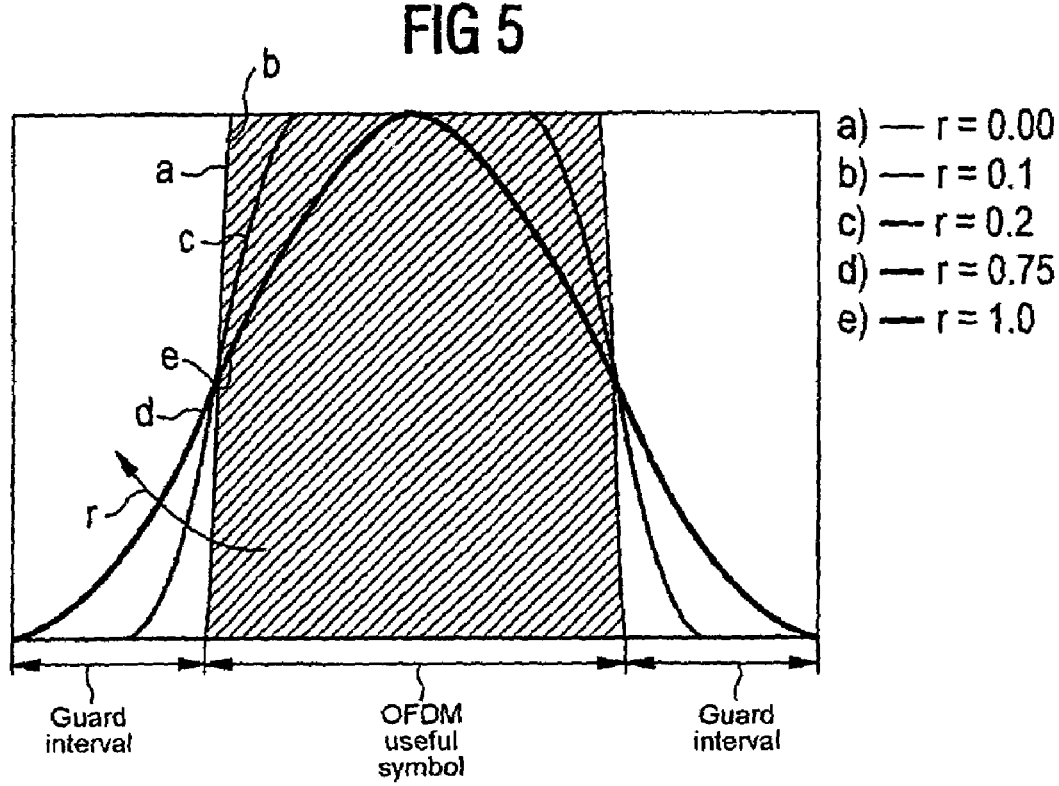
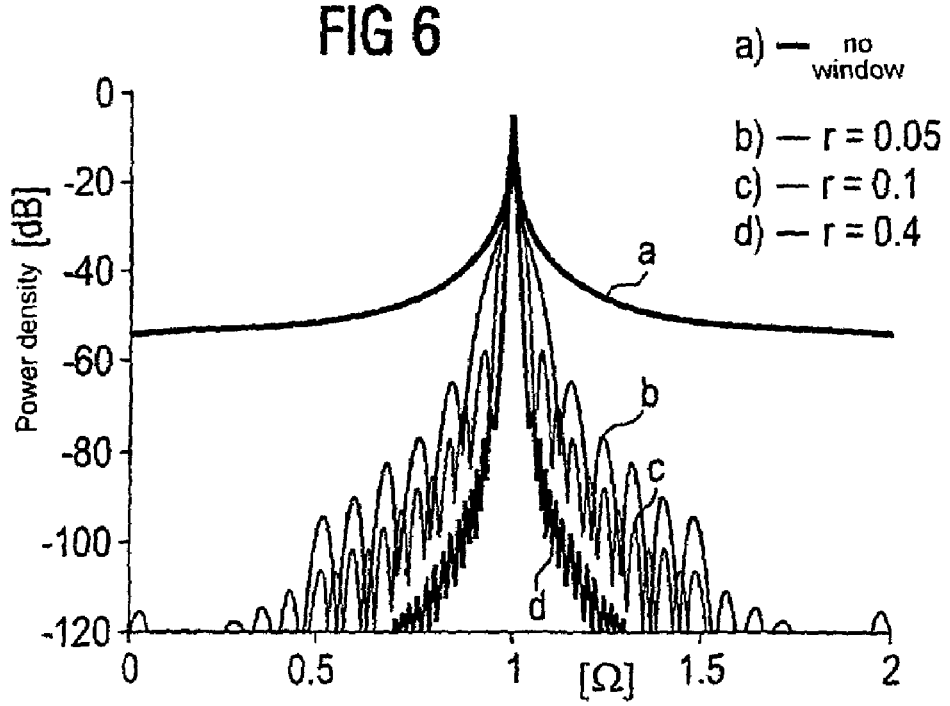

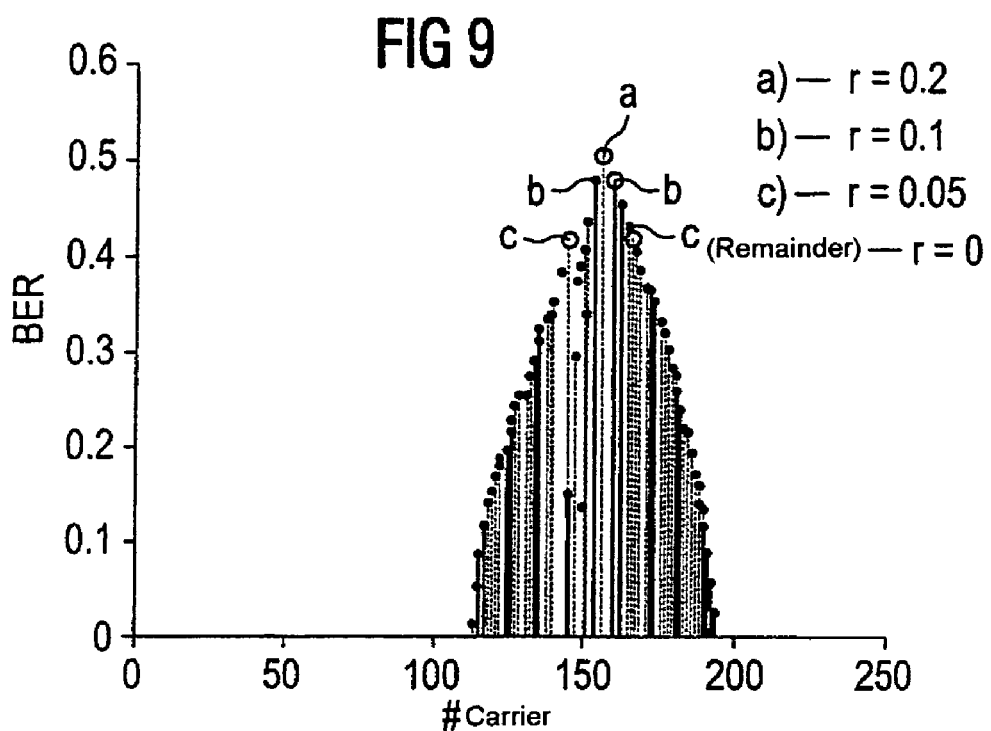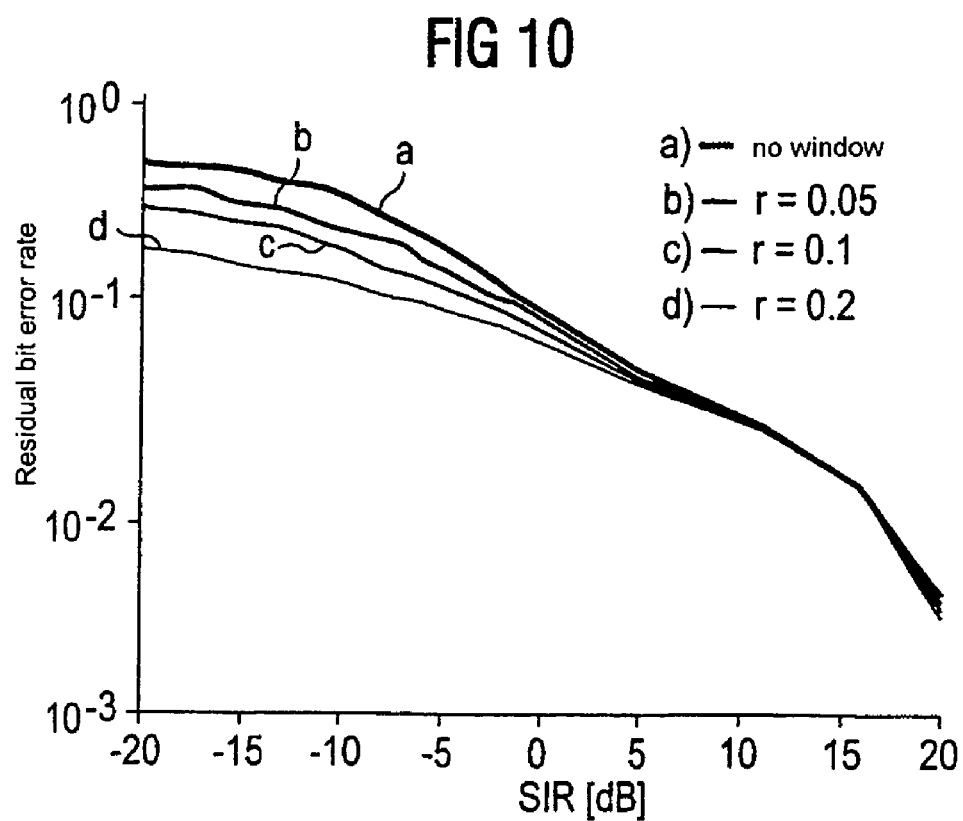

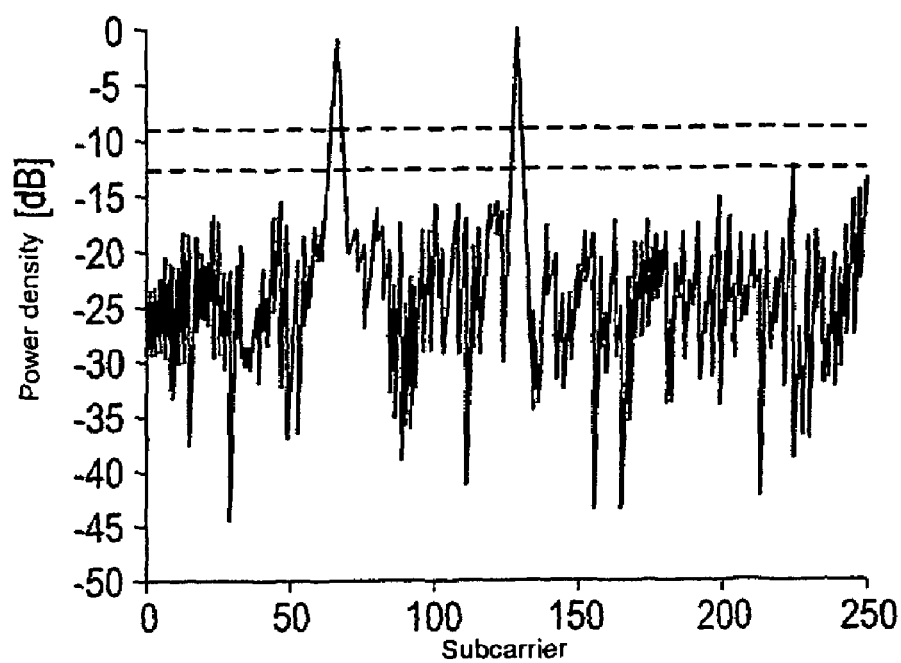
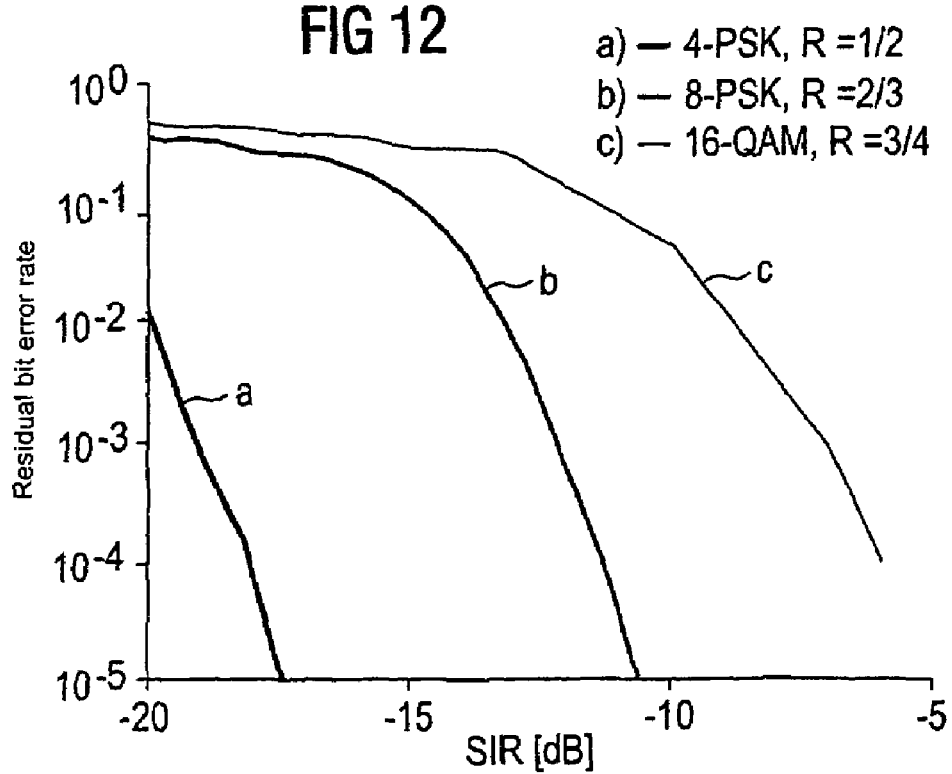

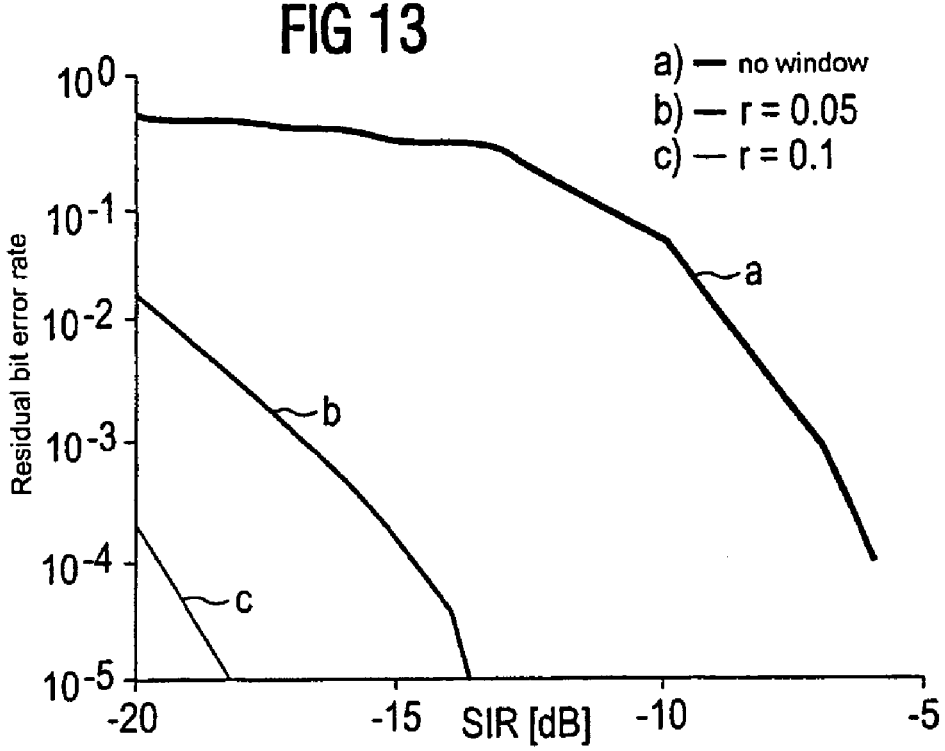
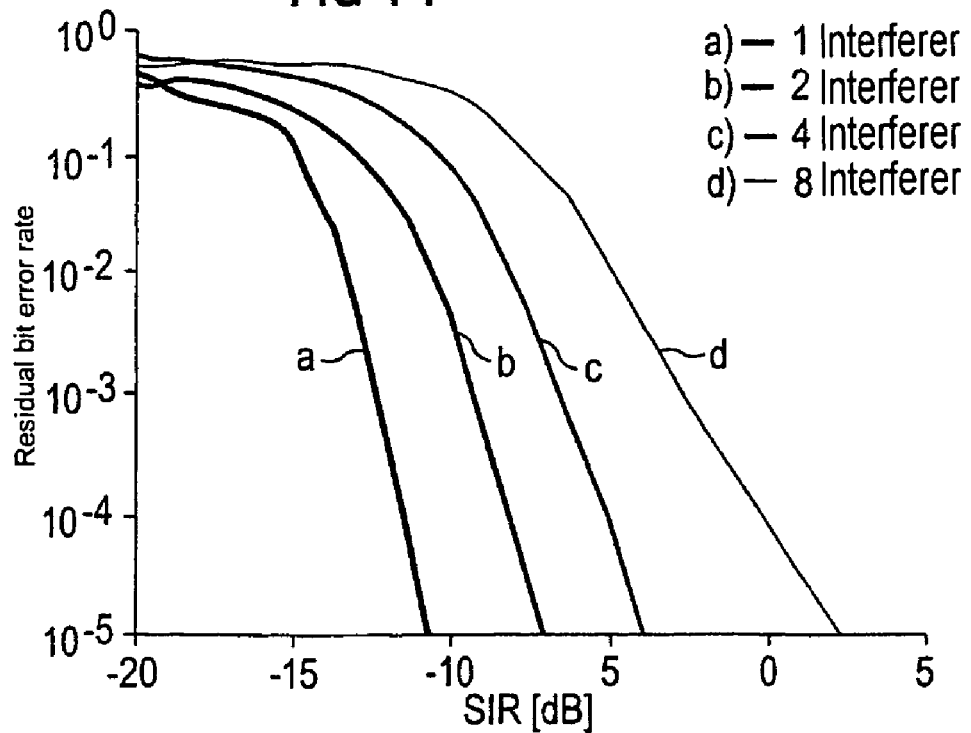

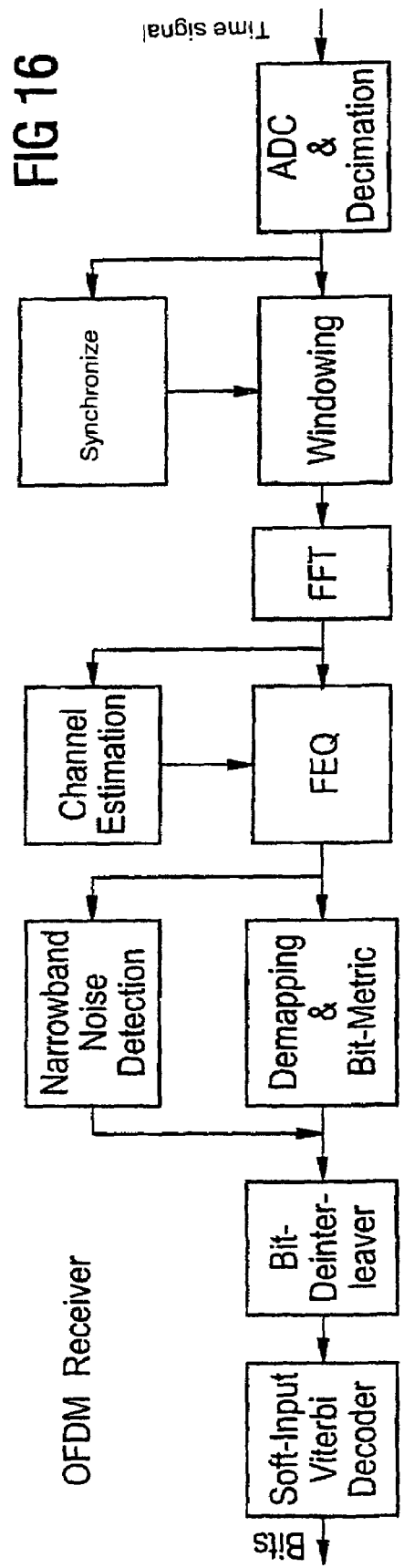

METHOD AND ORTHOGONAL FREQUENCY DIVISION MULTIPLEXING (OFDM) RECEIVER FOR REDUCING THE INFLUENCE OF HARMONIC INTERFERENCE ON OFDM TRANSMISSION SYSTEMS

BACKGROUND OF THE INVENTION

The OFDM (Orthogonal Frequency Division Multiplexing) technique is a powerful transmission technique in the field of Powerline Communication (PLC); that is to say, of signal transmissions on low-voltage networks. Frequency-selective channel properties that are detected analytically by an appropriate transfer function and are described uniquely are established virtually regularly in the PLC transmission channel via reflections that occur. An important reason for the selection of an OFDM transmission technique resides in the robust system behavior in the frequency-selective channels, and in the relatively low outlay on processing for equalizing the received signals.

An interference effect that is, in particular, typical of PLC applications but is not unique occurs on the low-voltage network; for example, owing to periodic switching processes caused by switched mode power supplies. This physical process generates short-term, harmonic, that is to say narrowband interference signals that are superimposed additively on the useful signal. These interference signals are also designated as "Inter-Carrier Interference", "Adjacent Sub-Carrier Interference" (AsCI) and "Adjacent Carrier Interference" (ACI), and negatively influence at the receiving end the transmission quality (residual/bit error rate) of a relevant data transmission system that is based on the OFDM technique. Such AsCI effects are generally produced by additive stationary harmonic interference components on the transmission channel, by Doppler interference components that arise as a consequence of a moving receiver, or else by phase noise processes of the receiver oscillator, whose interference spectrum contains significant energy components outside the OFDM subcarrier bandwidth.

In the past, AsCI in OFDM systems were either accepted, that is to say no compensation was performed, or were compensated by expensive equalizers and/or so-called channel tracking methods in the case of time-variant interference effects (for example, Doppler effect on the channel or phase noise present).

A known so-called windowing used in this case has so far been used solely at the transmitting end for the purpose of spectrum shaping, and at the receiving end for the purpose of improving the adjacent channel suppression. Document EP 0 802 649 A1, for example, has disclosed an application of windowing for reducing so-called spectral leakages and, thus, for adjacent channel suppression.

It is an object of the present invention, therefore, to reduce negative influencing, occurring at a receiving end, of the transmission quality (residual/bit error rate) of a data transmission system based on the OFDM technique via narrowband harmonic interference signals, and thereby to raise the transmission quality of the data transmission system.

SUMMARY OF THE INVENTION

Both the inventive method and the inventive receiver are based on the idea of using two separate technical measures, simultaneously, in order to obtain an enormously high interference immunity of the transmission system. One of the two technical measures is not alone sufficient to obtain this enormously high interference immunity. It is true that the OFDM transmission technique is already very robust in frequency-selective channels. However, this robustness is extended once again by the inventive measures. Now also incorporated are interference situations in which additive harmonic signals that are characteristic of PLC applications occur.

The high interference immunity, and thus the high efficiency of a relevant transmission system, are achieved by the simultaneous use of a window function and a determined item of reliability information. The window function is a Nyquist-shaped window function that, in particular, generates low side lobes in the subcarrier and interference spectra, but simultaneously leaves the orthogonality of the subcarriers unchanged. To determine the reliability information, a measurement is carried out, for example, when transmitting a so-called zero symbol, in order to detect the instantaneously active interference signals. The reliability information is then derived from the measured values obtained. The enormously high interference immunity is achieved when this subcarrier-specific information is taken into account in a so-called Viterbi decoder.

The concept of adaptive and subcarrier-specific modulation has been developed to date by taking exclusive account of the channel transfer function.

The interference power of a harmonic signal can have high dynamics. Measurements have shown that a logarithmic normal distribution is sensible for model description of these interference situations.

For the purpose of further raising the positive effects of the present invention, it is possible, on the one hand, to use more inclined window edges, that is to say larger rolloff factors, for example, in order to reduce still further the side lobes of the resulting interference spectra. It is possible, on the other hand, to take account of a lower coding rate in the convolutional coders, in order to achieve a substantially improved error correction.

The outlay on processing in the receivers is only insubstantially increased with the developed technical measures for raising the interference immunity. The task of measuring the interference power in the zero symbol and taking account of the reliability information in the Viterbi decoder increases the outlay on processing marginally. For example, the cosine rolloff window only slightly increases the overhead by lengthening the guard interval.

Additional features and advantages of the present invention are described in, and will be apparent from, the following Detailed Description of the Invention and the Figures.

BRIEF DESCRIPTION OF THE FIGURES

FIG. 3 shows a diagram referring to an interference power as a function of the subcarrier spacing, with a relative frequency offset of the interference as parameter.

FIG. 4 shows a diagram referring to an error floor for interference by a harmonic signal (16-QAM, uncoded, AWGN channel).

FIG. 5 shows a diagram referring to an expansion of a cosine rolloff window for various rolloff factors r= 0.05 ... 1.0.

FIG. 6 shows a diagram referring to an attenuation of the secondary maxima of the harmonic interference by a cosine rolloff windowing, as a function of the rolloff factor.

FIG. 9 shows a diagram referring to a subcarrier-specific bit error rate of an OFDM transmission with QPSK modulation in the AWGN channel (SIR=4 dB) for various rolloff factors.

FIG. 10 shows a diagram referring to a residual bit error rate of a coded transmission in the AWGN channel given an 8-PSK convolutional decoder with a rate R=⅔.

FIG. 11 shows a diagram referring to an estimate of harmonic interference in the AWGN noise.

FIG. 12 shows a diagram referring to a residual bit error rate of a coded transmission with reliability information for various bandwidth efficiencies (1 to 3 bits/s/Hz).

FIG. 13 shows a diagram referring to an effect of rolloff factors in the coded transmission system (AWGN channel, 16-QAM, R=¾, reliability information).

FIG. 14 shows a diagram referring to a residual bit error rate of a coded transmission with 2 useful bits/subcarriers (8-PSK, R=⅔) in the AWGN channel, for various numbers of interferers.

FIG. 16 shows a diagram referring to an OFDM receiver in accordance with the present invention.

DETAILED DESCRIPTION OF THE INVENTION

It has emerged that modifications on the OFDM system design are required and sensible in order to achieve a robust behavior even in the interference situations considered. Two separate technical measures are proposed in the receiver for this purpose.

On the one hand, a suitable window function is developed with the aid of which the received signal is weighted in order to achieve low side lobes in the interference spectrum. In addition, the interference signal power acting on each individual subcarrier is measured adaptively, and an item of reliability information is determined therefrom that is taken into account in the convolutional decoder in order to calculate the metric values. It is possible with the aid of these two technical measures to develop an OFDM transmission technique for PLC applications that behaves very robustly in the interference scenarios considered here.

The OFDM transmission technique considered in this report is based on the subdivision of the system bandwidth B in $N_{FFT}$ subchannels arranged equidistantly at the spacing $\Delta f$ on the frequency axis. In this case, the OFDM symbol duration $T_s$ is selected such that $\Delta f = 1 T_s$ holds for the subcarrier spacing. In this case, the subchannels or the subcarriers are orthogonal to one another, and there is no mutual influencing of adjacent subcarriers. Use is made in each subchannel of a rectangular modulation pulse such that the following transmission signal is produced for the k-th subcarrier taking account of the guard interval of length $T_G$.

$$g_k(t) = \begin{cases} e^{j2\pi k \Delta f t} & \forall t \in [-T_G, T_S] \\ 0 & \text{otherwise} \end{cases}$$

A complex modulation symbol $S_{n,k}$ is applied at the instant n to each individual subcarrier k. The subcarrier signals are modulated separately and transmitted in parallel as an aggregate signal. The n-th OFDM symbol is calculated analytically by an additive superimposition of the individual subcarrier signals, and represented by the following equation:

$$s_n(t) = \frac{1}{\sqrt{N_{FFT}}} \sum_{k=0}^{N_{FFT}-1} S_{n,k} g_k(t-nT) = \frac{1}{\sqrt{N_{FFT}}} \sum_{k=0}^{N_{FFT}-1} S_{n,k} e^{j2\pi k \Delta f (t-nT)}$$

An efficient calculation of the OFDM transmission signal, or of the associated time-discrete value sequence $S_{n,i}$, is performed with the aid of the Inverse Discrete Fourier Transform (IDFT).

$$s_{n,i} = \frac{1}{\sqrt{N_{FFT}}} \sum_{k=0}^{N_{FFT}-1} S_{n,k} e^{j2\pi k i/N}$$

It can immediately be seen from this representation that it is possible to represent an OFDM symbol by an additive superimposition of complex exponential functions that are each weighted with the modulation symbol $S_{n,k}$.

Because of the rectangular pulse shaping, the subcarrier spectra have an si-shaped profile $$G_k(f) = T s i(\pi T(f-k\Delta f)).$$

Figure 1:
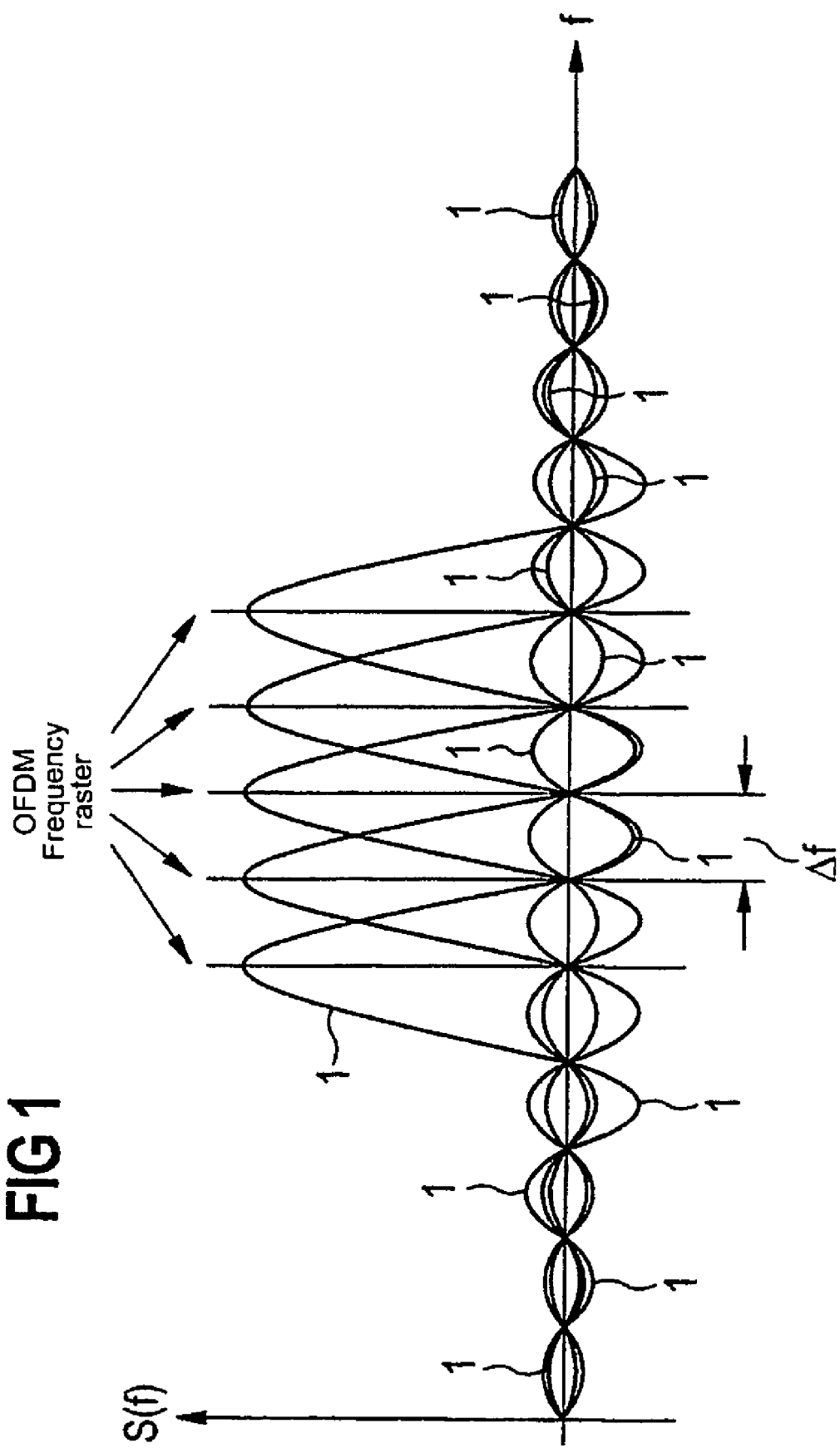
FIG. 1 shows a schematic diagram referring to a spectrum of an OFDM signal.

FIG. 1 shows the equidistant arrangement of the individual subcarriers on the frequency axis. One of the subcarriers is marked with the number 1. The other subcarriers have a corresponding profile.

Intercarrier Interference (ICI) between adjacent subchannels is completely avoided via the specially selected subcarrier spacing. However, the transmission system is sensitive to narrowband interference signals owing to the high side lobes in the spectrum of the individual subcarriers.

The received signal $r_n(t)$ is firstly correlated with the subcarrier-specific modulation pulses $g_k(t)$ of the k-th subcarrier. The received signal is thereby divided up into the various orthogonal subcarrier signal components. In this processing step, the orthogonality of the subcarrier signals is entirely retained even given transmission in frequency-selective channels. This property characterizes an important advantage of the OFDM transmission technique.

$$R_{n,k} = \frac{\sqrt{N_{FFT}}}{T_S} \langle r_n(t), g_k(t-nT) \rangle.$$

The above correlation is implemented with favorable outlay for the time-discrete received signal $r_{n,i}$ by using the Discrete Fourier Transform (DFT):

$$R_{n,k} = \frac{1}{\sqrt{N_{FFT}}} \sum_{i=0}^{N_{FFT}-1} r_{n,i} e^{-j2\pi ki/N}$$

Switching operations on the low-voltage network generate in the received signal additively superimposed harmonic or tonal interference signals in the form of harmonics of the system frequency $f_{system}$=50 Hz or switching frequencies of power supplies $f_{switching}$=100 kHz. This interference is caused by independent sources connected to the low-voltage network (for example, dimmers, switched mode power supplies, etc.). The function of these units is based on periodic switching of the system voltage. These switching operations lead to discrete spectra characterized by harmonics at the spacing of the switching frequency.

It is assumed for the present exemplary embodiment that the time duration of the interference signals is substantially greater than the symbol duration $T_s$ of the OFDM useful signal. For this reason, the interference amplitude $a_l$ is assumed to be constant within the symbol duration, and a harmonic interference signal with a random frequency $f_l$ is thereby produced in the short term.

In order to examine the interference of these additively superimposed harmonic interference signals on the OFDM useful signal considered, the aim is firstly to develop a suitable (statistical) model of the interference signals to be expected, and to describe it analytically. A narrowband interference signal can be interpreted in this connection as a complex exponential function $$m_l(t) = a_l \cdot e^{j(2\pi f_l t + \phi_l)}$$

The interference signal effective overall is composed of a number of individual interferers produced independently of one another, and is described by way of a model by the following four parameters:

a) number of the individual interferers $l=0, \ldots, L-1$;
b) interference frequency $f_l$;
c) interference amplitude $a_l$;
d) initial phase $\phi_l$.

The original switching operations can be regarded as being independent of one another. For this reason, the resulting interference signal is interpreted as a stochastic process with equally distributed frequencies $f_l$ and phases $\phi_l$ distributed equally in the interval $[0; 2\pi]$.

Using the above-explained assumptions, and neglecting the frequency-selective channel influence, the received signal r(t) is represented by an additive superimposition of the transmission signal, the harmonic interference signals and an additive noise process $n_{AWGN}(t)$.

$$r(t) = s(t) + n_{AWGN}(t) + \sum_{l=0}^{L-1} m_l(t)$$

In order to be able to estimate the disturbing influence of harmonic interference signals in the field of PLC applications, the aim is firstly to consider more precisely the effects of an individual interference signal on the OFDM useful signal. Because of the assumed constant amplitude $a_l$ within the symbol duration $T_S$ the interference signal spectra are identical to those of the subcarrier spectra, and exhibit a si-shaped profile. However, the frequency position of the interference spectra is to be regarded as random and independent of the useful signal spectrum. Because of the additive superimposition between useful signal components and interference signal components in the received signal r(t), an additive superimposition between useful signal components and interference signal components likewise occurs subcarrier-specifically at the output of the FFT.

$$R_{n,k} = S_{n,k} + N_{n,k}^{AWGN} + \sum_{l=0}^{L-1} M_{n,k,l}$$

The si-shaped signal spectra illustrated in FIG. 1 have high side lobes. It follows that an interference spectrum of random frequency position acts to disturb not only an individual OFDM subcarrier but, generally, to disturb very many adjacent ones. This state of affairs is illustrated diagrammatically in FIG. 2. The interference spectrum illustrated in FIG. 2 is marked with the number 2.

Figure 2:
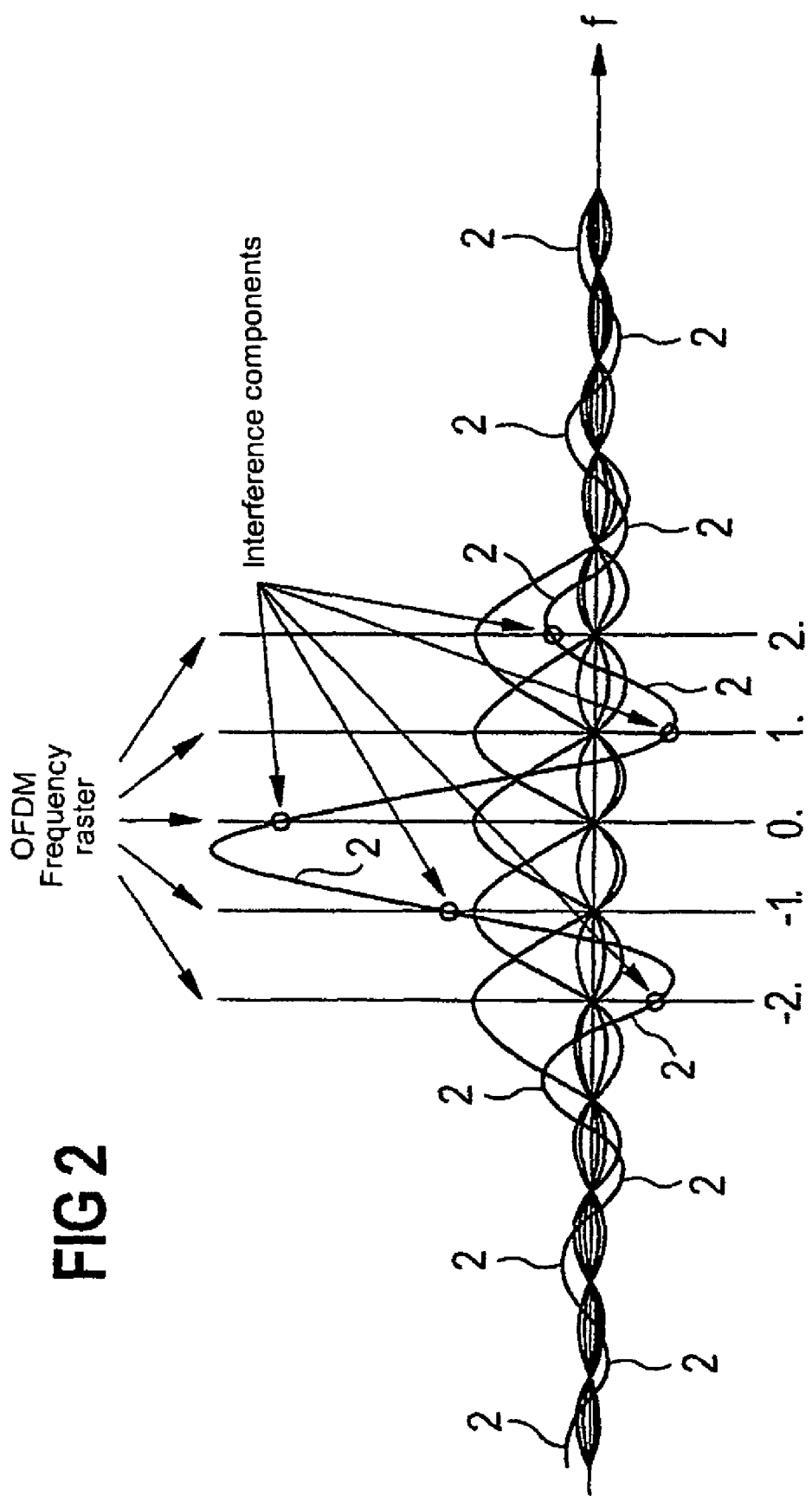
FIG. 2 shows a diagram referring to influencing adjacent subcarriers by a harmonic interference with a relative frequency offset.

A harmonic narrowband interference signal whose center frequency is located between two OFDM subcarriers has been assumed in FIG. 2. The effect of interference on adjacent subcarriers is clearly to be seen from this figure. Even relatively far removed subcarriers are still significantly disturbed beyond the high side lobes of the si-shaped interference spectra because of the center frequency considered here. The bit error rate of the overall OFDM system is influenced, in particular, by the frequency position of the interference signal relative to the OFDM useful signal, and also by the respective power of the interference signal. The resulting effect of the interference signal is specified quantitatively in FIG. 3 as a function of the frequency position.

It is clear that even in the case of a slight frequency offset $f_{offset}$ of the interference signal relative to the useful signal there is still a significant number of adjacent subcarriers in the range of influence of the interference. The resulting interference power is certainly reduced in these subcarriers with increasing spacing from the harmonic interferer, but in the case of very powerful interference signals this can lead nevertheless to a slight useful signal spacing in a large number of adjacent subcarriers.

The ratio between useful signal power and interference signal power is intended to serve in the following consideration as a measure of the strength of the interference signals. This procedure has the advantage that this variable is independent of the relative frequency offset $$f_{Offset} = \frac{f_{interference} - f_k}{\Delta f}$$

between the center frequency of the interference signal and the k-th subcarrier frequency. The total interference power distributed over all the OFDM subcarriers is calculated as follows:

$$P_N = \sum_{k=0}^{N_{FFT}-1} a_l^2 \cdot si_N^2(2\pi k \Delta f + f_{Offset}) = a_l^2$$

The ratio between useful signal power and interference signal power can be calculated as follows with the aid of this interference power:

$$SIR = \frac{P_S}{P_N} = \frac{N_{FFT} \cdot E_S}{a_i^2}$$

The considerations so far have been rendered independent of the additive noise process (AWGN channel) that is always present in the receiver. Consequently, the effect of harmonic interferers in an AWGN transmission channel is additionally considered, and the resulting bit error probability (BER) is calculated as a function of the influence of noise signals and interference signals (see FIG. 4). The respectively dominating interference variable limits the performance of the overall system. Consequently, a so-called error floor that is caused by a single harmonic interferer occurs even in the case of relatively high SNR values. An uncoded 16-QAM transmission was regarded as the useful signal.

Depending on its interference power, even a single harmonic interferer can reduce the transmission quality of the overall OFDM system drastically.

Two technical measures described individually in detail below are taken for the purpose of substantially increasing the robustness of the OFDM transmission system in the interference situations considered.

In the case of one technical measure, a received OFDM symbol is processed via cyclic rotation of the OFDM received symbol and subsequent Nyquist windowing in the time domain in such a way that there is a reduction in the interference spectrum outside the subcarrier bandwidth. Such a reduction comes about because the bandwidth in which the interference influences the signal-to-noise ratio of the individual orthogonal carriers is minimized.

In the other technical measure, in parallel with the first, a channel estimation of the channel transfer function is carried out on the subcarrier level, and the signal-to-noise ratio is calculated or estimated by estimating the interference power on the subcarrier level. This information relating to the noise power is subsequently considered as channel state information in the case of error decoding via, for example, a Viterbi decoder. The consequence of this is an optimization of the decoder metric.

As regards the first technical measure, the previously assumed "hard" truncation of the so-called guard interval within the received signal has led to si-shaped spectra both of the useful signals, but also of the interference signals. The high spectral side lobes of the OFDM subcarriers have given rise to a high sensitivity of the transmission system to narrowband interferers. In order to reduce the sensitivity of the system, low side lobes are generated by applying a "soft" window function.

As a result, the transmission system is already becoming substantially more robust to narrowband, additive interference. A slight extension of the previously considered guard interval is required for the application of this technique.

Nyquist window functions that can be implemented as cosine rolloff windows are used to reduce the spectral side lobes. What is involved here is the form of filters normally used for shaping transmitted pulses, with the modification that the profile of the signal is exchanged in the time and frequency domains. It holds that:

$$f_{CRO}(n) = \begin{cases} 1 & \text{for } \frac{2|(n-N_{FFT})|}{N_{FFT}} \leq 1-r \\ \frac{1}{2}\left(1 + \cos\left(\frac{\pi}{2r}\left(\frac{2(n-N_{FFT})}{N_{FFT}} - (1-r)\right)\right)\right) & \text{for } 1-r \leq \frac{2|(n-N_{FFT})|}{N_{FFT}} \leq 1+r \\ 0 & \text{for } \frac{2|(n-N_{FFT})|}{N_{FFT}} \geq 1+r \end{cases}$$

The calculated window function $f_{CRO}(n)$ has a so-called Nyquist edge in the time domain that is distinguished by a point symmetry at the boundaries of the useful symbol duration $T_S$. This property leads firstly in the frequency domain to the equidistant zeros, desired as before, at the spacing of the OFDM subcarriers, and thereby avoids the occurrence of intercarrier interference between the individual OFDM subcarriers. In addition, the side lobes in the interference signal spectra are substantially reduced. Consequently, the interference susceptibility of the overall OFDM system can be substantially reduced.

By contrast with the weighting of the received signal $r_n(t)$ with the aid of a rectangular window, it is necessary in the case of applying a cosine rolloff function $F_{CRO}$, for example, to take account of a somewhat greater guard interval length, or a shortening of the original guard interval is accepted. In the case of a cosine rolloff window function, this low efficiency loss is a function of the selected rolloff factor r alone. The relationship between a temporal extension of the guard interval and the rolloff factor r used is illustrated in FIG. 5.

Additional samples per OFDM symbol are required in order to implement the window edge in the time domain $$N_W = 2 \cdot N_{Window} = 2 \cdot \lfloor \frac{1}{2} \cdot r \cdot N_{FFT} \rfloor$$

These arise owing to the lengthening of the guard interval. Of these, $N_{Window}$ values are to be arranged respectively before and after the useful symbol duration $T_S$. The efficiency of an OFDM system with window evaluation is therefore $$\eta = \frac{N_{FFT}}{2 \cdot N_{Window} + N_{Guard} + N_{FFT}}$$

It is to be seen from FIG. 6 that a very marked reduction in the spectral side lobes occurs even in the case of relatively slight rolloff factors r. The resulting efficiency loss is, therefore, to be evaluated as relatively slight. There is already a substantially steeper drop in the extension of the interference signal spectrum for a rolloff factor of r=0.05, and so a substantially lower interference power can be achieved even at a short spacing from the interference frequency.

Figure 7:
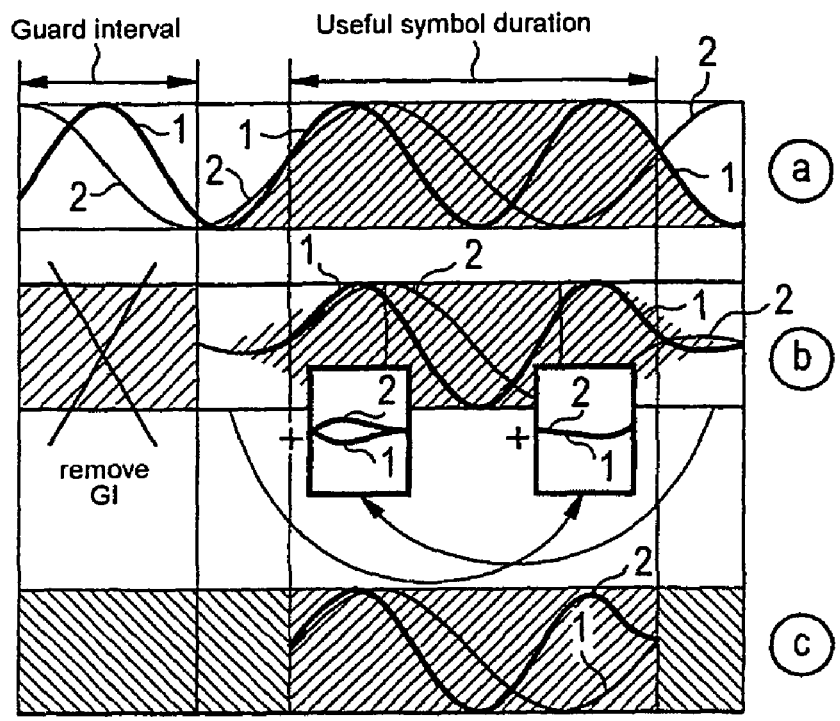
FIG. 7 shows a diagram referring to a received OFDM symbol with a cosine rolloff windowing.

The practical application of Nyquist windowing is to be explained diagrammatically below with the aid of FIG. 7 and using the example of cosine rolloff windowing.

Illustrated in part a) is an OFDM symbol including the guard interval (GI) of length $N_{Guard}$, the front and rear guard intervals of the cosine rolloff windowing with in each case $N_{Window}$ samples, and the useful interval of length $N_{FFT}$. Also illustrated are an arbitrarily selected subcarrier signal (green), a harmonic interference signal (red) and the cosine rolloff window function (blue).

The first step is to weight the received signal with the aid of the window function, the result being the signals specified in part b). This weighting leads to an attenuation of the received signal in the region of the window edges. Before the application of the FFT and in order to observe the periodicity in the windowed received signal, the signal components in the guard intervals are additively superimposed onto the weighted received signals in the useful interval with the aid of part b). The signal thus produced and illustrated in part c) is transformed into the frequency domain with the aid of an FFT of length $N_{FFT}$. The orthogonality of the OFDM subcarrier signals is completely preserved because of the standard period length $T_S$ on the basis of the symmetry properties in the cosine rolloff window function. This state of affairs is clearly to be seen from the following equation and from part c).

$$\hat{s}(i) = s(i) \cdot f(i) + s(i + N_{FFT}) \cdot f(i + N_{FFT})$$
$$= s(i) \cdot (f(i) + f(i + N_{FFT}))$$
$$= s(i)$$

By contrast, the interference signal m(t) generally exhibits no periodicity with reference to the symbol duration $T_S$, $$m(i) \neq m(i + N_{FFT}),$$

and this produces a change in the interference spectrum that is very much desired.

The principle of window evaluation is a purely passive method for reducing the influence of narrowband and tonal interferers. It therefore has the decisive advantage that there is no need, either at the transmitter or at the receiver, for precise information to be available in relation to the frequency position and power of the interference in order to achieve an improvement in the transmission power. All that need be provided when designing the system is a somewhat longer guard interval. When the rolloff factor r is being defined, it is possible to balance out the required robustness of the system and the somewhat reduced bandwidth efficiency. A good suppression of side lobes in the subcarrier and interference spectra can be achieved even with relatively small rolloff factors r. Rolloff factors $r \leq 0.1$ already lead to satisfactory results.

A rolloff factor of r=0.05 leads in an OFDM system with $N_{FFT}=256$ subcarriers to a lengthening of the guard interval by 13 samples, and reduces the bandwidth efficiency by only 5%.

Figure 8:
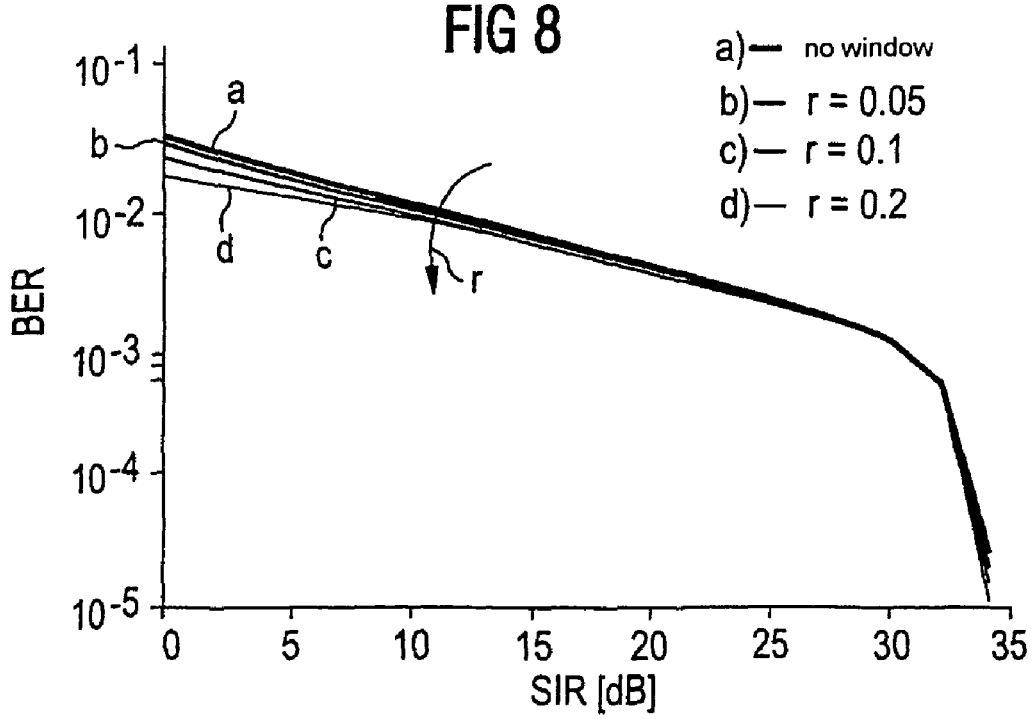
FIG. 8 shows a diagram referring to an effect of cosine rolloff window evaluation on an uncoded QPSK transmission in the AWGN with an interferer, as a function of the interference power.

FIG. 8 shows the resulting bit error rate of an initially uncoded OFDM transmission with $N_{FFT}=256$ subcarriers in the case of QPSK modulation in the AWGN channel. Different rolloff factors r are used as parameters.

As is to be expected, the BER remains very high even in the case of relatively high SIR values, because at least one of the subcarriers leads in each situation to a defective transmission owing to the harmonic interferer. There is certainly a very great change in the error pattern as a function of the different window functions and owing to the number of the disturbed subcarriers, but the resulting BER remains very high in all the cases considered. Both the frequency position and the phase of the interference signal were selected randomly in the present case under consideration.

The BER illustrated in FIG. 8 and produced in the overall system includes the mean error rate of all the subcarriers. More substantially informative, by contrast, is the subcarrier-specific BER, which is illustrated in FIG. 9 for an SIR value of 4 dB. A harmonic interference signal leads in the case of a rectangular windowing r=0 to the disturbance of approximately 80 of the 256 subcarriers used. A BER of approximately 15% results for this reason. By applying a cosine rolloff window function, by contrast, it is easily possible to at least halve the number of disturbed subcarriers.

However, the harmonic interference signal always causes a burst-like error structure that must be processed in the region of the channel coding; for example, by interleaver techniques.

As regards the second technical measure; the basis here is an interference situation in which directly adjacent subcarriers are disturbed by harmonic signals. Such disturbances entail burst-like error structures. These error structures are subsequently processed via a special error correction method. A convolutional code of rate R in conjunction with a frequency interleaver, for example, is considered for this purpose.

A maximum likelihood (ML) decoding is implemented in the receiver via the Viterbi algorithm. In this case, the conditional likelihood with which a symbol $R_i$ is received is maximized. In this case, the symbol $R_i$ is received on the assumption that a symbol $S_i$ has been sent. This optimization criterion is equivalent to the task of finding the transmitted symbol sequence that has a minimum Euclidean distance from the already present received symbol sequence. The first step is to consider the analytical derivation of an ML decoding. The complex received symbol Ri of a single subcarrier i can be represented analytically as follows.

$$R_i = H_i S_i + N_i$$

The following metric increments in the ML decoding result from assuming that the noise term $N_i$ is given by an average-free Gaussian noise process:

$$\lambda(S_i) = \ln(p(R_i|S_i))$$
$$= \ln\left(\frac{1}{2\pi\sigma_i^2} e^{-\frac{|R_i - H_i S_i|^2}{2\sigma_i^2}}\right)$$
$$= -\ln(2\pi\sigma_i^2) - \frac{1}{2\sigma_i^2}|R_i - H_i S_i|^2$$
$$\tilde{\lambda}(S_i) = -\frac{|H_i|^2}{\sigma_i^2}|\tilde{R}_i - S_i|^2.$$

The transmission coefficient $|H_i|^2$ and the noise power $\sigma_i^2$ must be known for each individual subcarrier according to the above equation. In the AWGN channel, the transmission coefficients $|H_i|^2$ for all the subcarriers are identical and therefore can remain unconsidered in the metric calculation. They contribute nothing to finding the transmitted symbol sequence with a minimum spacing from the existing received symbol sequence $R_i$.

The first step below is to consider by way of example an AWGN transmission channel and an interference situation in which the harmonic oscillation is arranged precisely between two OFDM subcarriers. FIG. 10 shows the residual bit error rate in an adopted AWGN channel as a function of the SIR values for various rolloff factors in the case of an 8-PSK modulation and a convolutional coder of rate R=⅔.

The correction capability of the convolutional decoder is limited by the coding rate R=⅔. In addition, in the above case use has been made in the Viterbi decoder of a metric that describes the channel via an AWGN model. The influence of the interference signal initially remained completely unconsidered in the metric.

A substantial improvement in the decoding behavior already can be achieved, however, by taking account in the decoding of an additional item of information describing the instantaneous interference state.

For this reason, the instantaneous interference power is estimated in a subcarrier-specific fashion and used in the Viterbi decoder as reliability information $RI_i$. This measurement can be carried out, for example, relatively easily in a symbol duration $T_S$ in which no transmitted symbol is on the line. In other words, this measurement is carried out when, as it were, a so-called zero symbol is being sent. The signal level (absolute value of the complex received symbols) measured in this case at the FFT output is used directly in the Viterbi algorithm as reliability information.

$$RI_i = |R_i|$$

In this measurement, background noise that is always present and stochastically distributed is determined, on the one hand. On the other hand, however, the deterministic interference signals are also measured at the same time. Such a measurement result is illustrated by way of example in FIG. 11. The noise values are suppressed in a suitable quantization step, and the interference signal amplitudes are used as reliability information for decoding the OFDM useful signals following thereupon in the Viterbi algorithm.

When this reliability information is taken into account in the decoder, there is a substantial improvement in the results. FIG. 12 shows the residual bit error rate for transmission with various bandwidth efficiencies (from 1 to 3 bits/s/Hz) in the AWGN channel, taking account of the reliability information. A notable feature is the clear difference in the system robustness as a function of the bandwidth efficiency of the method. If the residual bit error rate is also low in the case of strong interference during a coded QPSK transmission, the same robustness cannot be achieved in conjunction with doubling the bit number per carrier until the signal power is 6 dB higher.

The results in FIG. 12 were obtained taking sole account of the reliability information on the basis of the interference power measurement. If the two technical measures described in the present text are used simultaneously for interference immunity (windowing and reliability information), a substantial rise is achieved overall in the performance of the transmission system.

Illustrated in FIG. 13 are the results, calculated with the aid of a simulation program, for a 16-QAM coded transmission using code R=¾ and taking account of the reliability information in the AWGN channel. At the same time, a cosine rolloff window with two different factors r is taken into account. How dramatic an improvement can be achieved by combining the two measures is clearly to be seen from FIG. 13.

The results discussed so far relate to an AWGN channel. In a frequency-selective channel, two random events coincide. On the one hand, the frequency-selective attenuation of the subcarrier signals is to be observed, while on the other hand the harmonic interference signals randomly positioned on the frequency axis occur. If these interference signals fall into a region of strong channel attenuation, there is no increase in the BER, or only a slight one. If, however, the interference signal is active in a very good channel section, an increase in the residual bit error rate is to be expected.

Further considerations have shown that in the case of Powerline Communication (PLC) applications one interference signal occurs on average per megahertz of useful bandwidth. It is necessary for this reason also to consider the influence of a number of harmonic interferers. The residual bit error rate of a coded transmission with two useful bits/subcarriers in the AWGN channel is illustrated in FIG. 14. The total interference power is calculated in this case from the sum of the individual interference powers. This is taken into account in the illustration such that the loss of approximately 3 dB when the number of interferers is doubled results not on the basis of an increased interference power, but owing to the interference in separate frequency bands. The interference power of a single subcarrier can rise sharply through the occurrence of a number of interferers.

Figure 15:
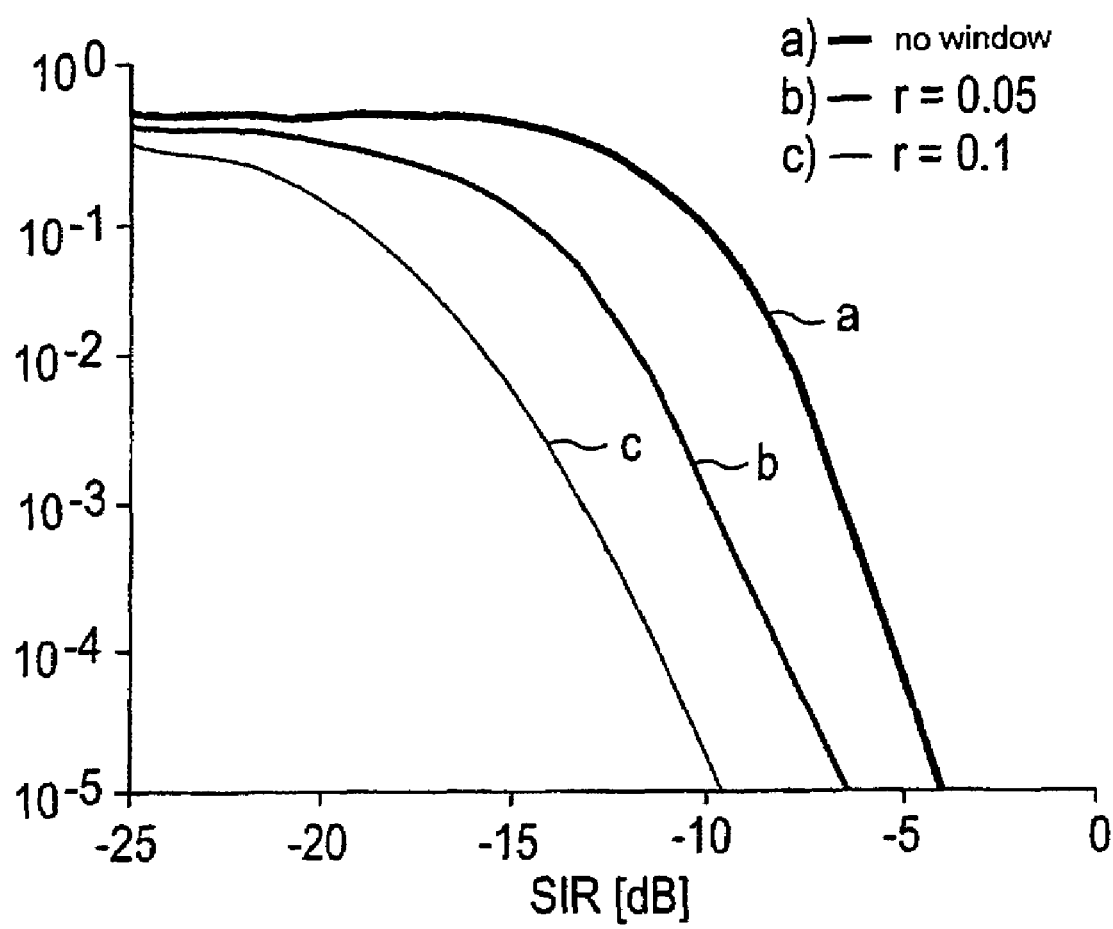
FIG. 15 shows a diagram referring to a residual bit error rate with 2 useful bits/subcarriers (8-PSK, R=½) given 4 interferers in the AWGN channel, with various rolloff factors.

If a window evaluation with a cosine rolloff window is applied in the case of an OFDM system influenced by a number of interferers, a stark reduction in the residual bit error rate is to be determined once again. The gain turns out to be somewhat lower with a rising number of interferers. This is illustrated in FIG. 15 for the case of influence exerted by four interferers of equal strength. It is also to be seen at this point that even very low rolloff factors yield a gain of several dB.

A receiver according to the present invention is illustrated in FIG. 16 for the purpose of carrying out the method described above. Apart from the generally known OFDM receiver, this receiver has both parts for detecting narrowband interference signals, and parts for Nyquist windowing.

Although the present invention has been described with reference to specific embodiments, those of skill in the art will recognize that changes may be made thereto without departing from the spirit and scope of the present invention as set forth in the hereafter appended claims.

The invention claimed is:

1. A method for reducing an influence of harmonic interference on OFDM transmission systems for data transmission using a windowing technique, the method comprising the steps of:
    processing a received OFDM symbol via cyclic rotation of the OFDM symbol and subsequent Nyquist windowing in a time domain such that a reduction in an interference spectrum outside a subcarrier bandwidth occurs;
    carrying out in parallel a channel estimation of a channel transfer function on a subcarrier level;
    determining a signal-to-noise ratio, via one of calculation and estimation by estimating an interference power on the subcarrier level; and
    using a result of the determination as channel state information during error decoding via a decoder.

2. A method for reducing an influence of harmonic interference on OFDM transmission systems for data transmission as claimed in claim 1, wherein use is made of a Nyquist window with flat edge profiles to further reduce the interference spectrum, and use is made of a low coding rate in a convolutional coder to further improve error correction.

3. A method for reducing an influence of harmonic interference on OFDM transmission systems for data transmission as claimed in claim 1, wherein if a cosine rolloff window as a Nyquist window is applied, a large rolloff factor is used, and if a cosine rolloff window as a Nyquist window is not applied, a low coding rate is used in a convolutional coder.

4. An OFDM receiver for reducing an influence of harmonic interference on OFDM transmission systems for data transmission using a windowing technique, the OFDM receiver comprising parts for detecting narrowband interference signals and parts for Nyquist windowing, wherein a received OFDM symbol is processed via cyclic rotation of the OFDM symbol and subsequent Nyquist windowing in a time domain such that a reduction in an interference spectrum outside a subcarrier bandwidth occurs, a channel estimation of a channel transfer function is carried out in parallel on a subcarrier level, a signal-to-noise ratio is determined via one of calculation and estimation by estimating an interference power on the subcarrier level, and a result of the determination is used as channel state information during error decoding via a decoder.

5. A method for reducing an influence of harmonic interference on OFDM transmission systems for data transmission using a windowing technique, the method comprising the steps of:

processing a received OFDM symbol via cyclic rotation of the OFDM symbol and subsequent Nyquist windowing in a time domain such that a reduction in an interference spectrum outside a subcarrier bandwidth occurs;

carrying out in parallel a channel estimation of a channel transfer function on a subcarrier level;

determining a signal-to-noise ratio, via one of calculation and estimation by estimating an interference power on the subcarrier level; and using a result of the determination as channel state information during error decoding via a decoder, wherein use is made of a Nyquist window with flat edge profiles to further reduce the interference spectrum, and use is made of a low coding rate in a convolutional coder to further improve error correction.

* * * * *